United States Patent [19]

Sato et al.

[11] Patent Number: 6,009,248
[45] Date of Patent: Dec. 28, 1999

[54] DELAY OPTIMIZATION SYSTEM TO CONDUCT OPTIMIZATION FOR SATISFYING DELAY CONSTRAINTS ON THE CIRCUIT AND METHOD THEREFOR

[75] Inventors: Koichi Sato; Hideyuki Emura; Naotaka Maeda; Masamichi Kawarabayashi, all of Tokyo, Japan

[73] Assignee: NEC Corporation, Tokyo, Japan

[21] Appl. No.: 08/866,682

[22] Filed: May 30, 1997

[30] Foreign Application Priority Data

Dec. 3, 1996 [JP] Japan .................................. 8-323108

[51] Int. Cl.$^6$ .................................................. G06F 17/50
[52] U.S. Cl. ................... 395/500.03; 395/500.09; 395/500.1; 395/500.11; 395/500.12; 395/500.19
[58] Field of Search ........................... 364/488, 489, 364/490, 491; 395/500.03, 500.09, 500.1, 500.11, 500.12, 500.19

[56] References Cited

U.S. PATENT DOCUMENTS 5,572,437  11/1996  Rostoker et al. ..................... 364/489
5,727,187   3/1998  Lemche et al. ...................... 395/500

FOREIGN PATENT DOCUMENTS 6-243199   9/1994   Japan .

OTHER PUBLICATIONS

Sato et al "Post–Layout Omptimization for Deep Submicron Design," ACM, pp. 1–6, Jan. 1996.
Lillis et al "Optimal and Efficient Buffer Insertion and Wire Sizing," IEEE, pp. 259–262, Jan. 1995.
Kannan et al "A Methodoligy and Algorithms for Post–Placement Delay Optimization," ACM, pp. 327–332, Jan. 1994.

Bob Wiederhold "Deep–Submicron ASIC Design Requires Design Planning," EDN, pp. 95–100, Feb. 1995.

Barbara Tuck "Floorplanner Support Multiple Place–and–Route Tools, Block Generators," A Pennwall Publication, vol. 32, No. 4, p. 132, Apr. 1993.

*Primary Examiner*—Kevin J. Teska
*Assistant Examiner*—Vuthe Siek
*Attorney, Agent, or Firm*—Scully, Scott, Murphy & Presser

[57] ABSTRACT

A delay optimization system including a layout processing unit for receiving the input of circuit specification of a target circuit to conduct layout, as well as extracting wiring information, an optimization processing unit for conducting optimization with reference to the wiring information, as well as generating circuit change information and inserted buffer information, and a constraints violations determining unit for determining whether a circuit generated as a result of the layout by the layout processing unit satisfies delay constraints set for the target circuit, the layout processing unit executing initial layout based only on circuit information synthesized based on the circuit specification of the target circuit and re-layout with reference to the circuit change information and inserted buffer information generated by the optimization processing unit.

18 Claims, 10 Drawing Sheets

LOGICAL HIERARCHY

LAYOUT NOT CORRESPONDING
TO LOGICAL HIERARCHY

DELAY OPTIMIZATION SYSTEM TO CONDUCT OPTIMIZATION FOR SATISFYING DELAY CONSTRAINTS ON THE CIRCUIT AND METHOD THEREFOR

BACKGROUND OF THE INVENTION

1. Field of the Invention

The present invention relates to an optimization system which locally changes a circuit having gates located and wired thereon through layout to conduct optimization for satisfying delay constraints on the circuit, and a method therefor.

2. Description of the Related Art

Optimization systems of this kind locally change a circuit to realize optimization and reduction of the circuit size for satisfying required constraints after receiving the input of circuit information which is a result of locating and wiring of gates by layout and conducting logic synthesis. With locating position of gates, wiring topology, wire length, wire capacitance, wire resistance and other parameters applied out of layout results, optimization is conducted so as to satisfy required delay constraints while calculating accurate delay and power consumption based on these information.

Conventional delay optimization techniques using layout information will be described in the following.

FIG. 9 is a flow chart showing a flow of processing conducted by one of conventional delay optimization systems.

With reference to FIG. 9, initial logic synthesis is first conducted with respect to applied layout results of a target circuit (Step 901) and then gates are initially located on the initially synthesized target circuit (Step 902). Next, based on the initial location results of the gates, circuit optimization is conducted so as to satisfy delay constraints set for the target circuit (Step 903). Then, only at a part changed by the optimization (Step 903), re-placement processing of the gates is conducted (Step 904). Next, determination is made whether there exists a part still violating the delay constraints in the target circuit and when there exists a part which fails to satisfy the delay constraints, the routine returns to the optimization of Step 903 (Step 905). On the other hand, when all the delay constraints are satisfied, routing of gates is actually conducted to complete processing (Steps 905 and 906).

Layout information 910 shown in FIG. 9 includes gate locating position coordinates generated at the processing of Step 902 and other parameters and is referred to in each processing of Steps 903, 904 and 906. In the processing of Steps 904 and 906, the layout information is updated according to the contents of re-placement processing and routing processing. Circuit change information 911 includes information regarding connection relationship of gates changed by the processing of Step 903 and is referred to in the processing of Step 904. Locational constraints information 912 includes information regarding constraints on locating position of gates obtained by the processing of Step 903 and is referred to in the processing of Step 904.

In the optimization and the gate re-placement processing at Steps 903 and 904, local change of a target circuit is conducted such as insertion of buffers and gate re-sizing in order to satisfy delay constraints on the target circuit. In a case of newly inserting a buffer in a target circuit, since no wiring of the target circuit is conducted at the time of insertion of the buffer, a minimum spanning tree is generated based on gate locating position to place the buffer at a branching point of the tree or near a leaf. Here, the minimum spanning tree represents a tree which connects all the terminals and allows no branch-out in the middle of a branch to make the length of the whole tree the shortest. Wire delay is calculated considering the minimum spanning tree as real wires. FIG. 10 shows an example of a minimum spanning tree of the already located gates.

Buffer insertion position is limited to a branching point or a leaf of the minimum spanning tree and the position of the inserted buffer is given as a locating position constraint in the re-placement processing of Step 1004. The processing of Step 1004 therefore intends to locate a buffer to be newly inserted at the position given as a constraint as much as possible.

FIG. 11 is a flow chart showing a flow of processing conducted by another example of conventional delay optimization systems. In the illustrated conventional technique, optimization is realized by gate re-sizing and buffer insertion.

With reference to FIG. 11, initial logic synthesis is first conducted with respect to applied layout results of a target circuit (Step 1101) and then initial layout is conducted for the initially synthesized circuit (Step 1102). Next, based on the results of the initial layout, circuit optimization is conducted so as to satisfy delay constraints set for the target circuit (Step 1103). Then, only a part changed by the optimization (Step 1103) is re-laid out (Step 1104). Next, determination is made whether there exists a part still violating delay constraints in the target circuit and when there exists a part which fails to satisfy the delay constraints, the routine returns to the optimization of Step 1103 (Step 1105). On the other hand, when all the delay constraints are satisfied, processing is completed.

Layout information 1110 shown in FIG. 11 includes wire capacitance, wire delay and other parameters generated at the processing of Step 1102 and is referred to in the optimization of Step 1103. Connection change information 1111 includes information regarding a connection relationship of gates changed by the processing of Step 1103 and is referred to in the processing of Step 1104.

In the optimization of Step 1103, such local change of a circuit is made as buffer insertion and gate re-sizing to satisfy delay constraints on the target circuit. Re-sizing of a gate is an optimization technique realized by replacing an already located gate with a gate having the same logic and a different drivability. In other words, a gate which fails to satisfy a delay time (required time) required by delay constraints is replaced with another gate which satisfies the requested time.

In the re-layout at Step 1104, no change occurs in wire delay because a buffer placed immediately behind a gate causes fanout wiring to change little. In a case of re-sizing of a gate, the gate is placed at a position where a replaced gate is used to be placed, thereby enabling layout with the same delay as estimated in the delay optimization system.

FIG. 12 is a flow chart showing a flow of processing conducted by still another example of conventional delay optimization systems. In the illustrated conventional technique, optimization is realized by the another buffer insertion.

With reference to FIG. 12, initial logic synthesis is first conducted with respect to applied layout results of a target circuit (Step 1201) and then the initially synthesized circuit is initially laid out (Step 1202). After the initial circuit synthesis of Step 1201, layout of the initial circuit is conducted at the initial layout of Step 1202. Next, gate placement information 1210 is obtained from the initially laid out target circuit and a buffer is inserted on a segment of a wire without destroying the Steiner tree structure generated based on the locational information to conduct delay optimization of the target circuit (Step 1203). Although description is here made assuming the segments to be branching points of a wire and a part of the wire between terminals, via (where a wiring layer changes), branching points and a part of a wire between terminals may be regarded as segments in practice. Next, re-layout is conducted based on the circuit change information 1211 obtained after the optimization (Step 1204). Determination is then made whether there exists a part still violating the delay constraints in the target circuit and when there exists a part failing to satisfy the delay constraints, the routine returns to the optimization of Step 1203 (Step 1205). On the other hand, if all the delay constraints are satisfied, processing is completed.

In the optimization of Step 1203, such optimization is conducted as enables relatively accurate calculation of an wire RC delay. Delay is generally expressed by the following equation.

(delay)=(intrinsic gate delay)+(propagation)+(wire RC delay of wire)

Intrinsic delay of a gate is a delay between an input terminal and an output terminal within the gate. Propagation delay of a gate is a delay based on signal propagation and independent of wiring topology, which is calculated from a wire capacitance between gates. Wire RC delay of a wire is a delay based on signal propagation and is dependent on wiring topology. There are several kinds of wire RC delay calculation methods with different delay precisions. Elmore delay calculation will be described as an example.

With a terminal on the source side denoted as $n_i$ and a terminal on the sink side as $n_j$, an wire RC delay $tpd_{RCi,j}$ between $n_i$ and $n_j$ will be calculated by the following equations (1) to (4).

$$tpd_{RCi,j} = \beta_j TR_{i,j} \qquad (1)$$

$$\beta_j = \log\left(\frac{Vdd}{Vdd - Vt_j}\right) \text{ (rise)} \qquad (2)$$

$$= \log\left(\frac{Vdd}{Vt_j}\right) \text{ (fall)}$$

$$TR_{i,j} = \sum_{S_{k,l} \in P(i,j)} R_{k,l}\left(\frac{1}{2}C_{k,l} + Cf_{k,l}\right) \qquad (3)$$

$$Cf_{k,l} = \sum_{S_{o,p} \in TFO(k,l)} (C_{o,p} + Ci_p) \qquad (4)$$

In the above equations, $n_i$ represents a branching point of a wire or a terminal. $1 \leq i \leq N$ holds for i, and N represents the total number of terminals connected to the wire and branching points. $S_{i,j}$ represents a segment between $n_i$ and $n_j$. $R_{i,j}$ represents a resistance between $n_i$ and $n_j$ at $S_{i,j}$, represents a capacitance between $n_i$ and $n_j$ at $S_{i,j}$. Here, $Ci_j$ takes a value of a terminal capacitance of $n_j$ when $n_j$ is a gate terminal and otherwise it is zero. Rise represents $\beta_j$ for a rise signal and fall represents $\beta_j$ for a fall signal. $P(i,j)$ represents a set of segments between $n_i$ and $n_j$. TFO (k,l) represents a segment of $S_{k,l}$ in the transitive fanout direction. Transitive fanout represents a segment from a predetermined part toward the fanout direction. Transitive fanin represents a segment from a given part toward the fanin direction. Taking the circuit diagram illustrated in FIG. 13 as an example, an wire RC delay between $n_1$ and $n_5$ will be expressed by the following equations, where Vdd represents a power supply voltage and $Vt_5$ represents an input threshold voltage at $n_5$.

$$tpd_{RC(rise)1,5} = \log\left(\frac{Vdd}{Vdd - Vt_5}\right)TR_{1,5} \qquad (5)$$

$$tpd_{RC(fall)1,5} = \log\left(\frac{Vdd}{Vt_5}\right)TR_{1,5} \qquad (6)$$

$$TR_{1,5} = R_{1,2}\left(\frac{C_{1,2}}{2} + (C_{2,3} + C_{2,4} + C_{4,5} + C_{4,6} + Ci_3 + Ci_5 + Ci_6)\right) + \qquad (7)$$
$$R_{2,4}\left(\frac{C_{2,4}}{2} + (C_{4,5} + C_{4,6} + Ci_5 + Ci_6)\right) +$$
$$R_{4,5}\left(\frac{C_{4,5}}{2} + Ci_6\right)$$

As described in the foregoing, it is necessary for estimating an wire RC delay to obtain a resistance and a capacitance of each segment of a tree structure of wiring from a layout system. Other wire RC delay calculation methods than the Elmore delay calculation are also the same in this respect.

Since in this conventional technique, wiring is expressed as a Steiner tree to enable comprehension of the tree structure, relatively accurate calculation of an wire RC delay is possible among delay components. Steiner tree is a tree connecting all the terminals, while allowing branch-out in the middle of a branch. When a buffer is inserted into an appropriate position in optimization, there is no knowing how much layout changes. It is therefore extremely important to conduct optimization while accurately estimating an wire RC delay. In this conventional technique, a Steiner tree is generated and a buffer is placed on the tree in order to accurately consider an wire RC delay.

Resistance and capacitance of a segment will be expressed by the following equations (8) and (9).

$$R = r \cdot L \cdot W \qquad (8)$$

$$C = c \cdot L/W \qquad (9)$$

In the above equations, r represents a resistance per unit area and c represents a capacitance per unit length, both of which are constants. L represents a wire length and W represents a wire width. Since resistance and capacitance have values proportional to a wire length, the resistance and the capacitance are allocated in proportion to the wire length.

The above described conventional delay optimization techniques, however, have the following drawbacks.

According to the first conventional technique, no wiring is actually conducted at the time of optimization illustrated at Step 903 of FIG. 9. In the calculation of a wire delay, therefore, the above-mentioned minimum spanning tree is regarded as real wiring. Real wiring in general takes topology approximate to that of a Steiner tree rather than that of a minimum spanning tree. In addition, the above-described optimization takes neither detoured wiring nor wire RC delay into consideration. As a result, there are cases where expected results are not obtained because a delay estimation result obtained by the optimization differs from a delay value obtained after routing.

According to the second conventional technique, gate re-sizing and buffer insertion are conducted in the optimization illustrated at Step 1103 of FIG. 11. Buffer insertion here is to insert a buffer so as to place immediately behind a gate and in layout, adjacent to the same such that the number of fanouts of the gates will be "1". Limiting a buffer locating position to immediately behind a gate is intended for making an accurate delay estimation in logic synthesis. This disables drastic delay optimization.

The third conventional technique has three problems. First is a large difference between an estimated delay value and a real delay value because a tree structure of a Steiner tree generated in the optimization disagrees with a tree structure of real layout. As a result, optimization for obtaining a circuit satisfying delay constraints can not be appropriately conducted, whereby the number of iterations of layout is increased to disable designing to be completed in a short time period.

Second problem is difficulty in deciding a buffer insertion position because of lack of methods for heuristic calculating buffer insertion position on a wire segment.

Thirdly, this conventional technique employs, as information for use in generating a Steiner tree, only the gate locating position information but not the wiring information. In the optimization, a Steiner tree is generated without considering wiring crowdedness. It is therefore impossible to take account of detoured wiring which will be made in layout in practice, so that delay error is liable to occur.

SUMMARY OF THE INVENTION

An object of the present invention is to eliminate the above-described conventional shortcomings and provide an optimization system which conducts delay optimization in consideration of circuit layout employing wiring information obtained by initial layout, as well as conducting re-layout taking information regarding layout constraints obtained by the optimization into consideration, to realize appropriate optimization with minimum difference between estimations of constraints on a target circuit made in the optimization and constraints on the target circuit after wiring is actually conducted, and a method therefor.

Another object of the present invention, in addition to the above object, is to provide an optimization system which conducts appropriate optimization to avoid iteration of optimization, thereby reducing required time, and a method therefor.

Still another object of the present invention is to provide an optimization system which conducts delay optimization appropriately and efficiently to realize appropriate and efficient optimization such as cut-off of power consumption and reduction of a circuit area, and a method therefor.

According to the first aspect of the invention, a delay optimization system which performs layout for receiving the input of circuit specification of a target circuit to conduct locating and wiring of a gate and optimization for modifying the circuit so as to satisfy delay constraints set for the target circuit, comprises layout processing means for receiving the input of circuit specification of the target circuit to conduct the layout, as well as extracting wiring information at least including information on a resistance, a capacitance and topology of a wire, optimization processing means for conducting optimization based on the results of the layout by the layout processing means with reference to the wiring information extracted by the layout processing means, as well as generating circuit change information regarding a changed part of the circuit generated when the circuit is modified by the optimization and inserted buffer information indicative of limitations on buffer insertion for optimization, and constraints violations determining means for determining whether a circuit generated as a result of the layout by the layout processing means satisfies delay constraints set for the target circuit, wherein the layout processing means conducts before the execution of the optimization by the optimization processing means, initial layout based only on circuit information logically synthesized based on the circuit specification of the target circuit, and after the execution of the optimization by the optimization processing means, re-layout with reference to the circuit change information and the inserted buffer information generated by the optimization processing means.

The optimization processing means may determine existence/non-existence of a path for which optimization is to be conducted among the paths of the circuit laid out by the layout processing means, select a wire as a target of optimization when the determination is made that there exists a path for which the optimization is to be conducted, determine the order of execution of optimization for a segment of the wire selected as a target of the optimization, calculate all the possible combinations of types and insertion positions of buffers or inverters to be inserted in order to satisfy the delay constraints set for the target circuit and calculates the degree of improvement in the delay constraints at a buffer or inverter insertion position for each combination to determine a combination achieving the highest degree of improvement as an optimum combination, and generate circuit change information obtained as a result of the change of the laid out circuit based on the determined type of buffer or inverter and insertion position.

The optimization processing means may determine existence/non-existence of a path for which optimization is to be conducted among the paths of the circuit laid out by the layout processing means, select a wire as a target of optimization when the determination is made that there exists a path for which the optimization is to be conducted, determine the order of execution of optimization for a segment of the wire selected as a target of the optimization, calculate all the possible combinations of types and insertion positions of buffers or inverters to be inserted in order to satisfy the delay constraints set for the target circuit and calculates the degree of improvement in the delay constraints at a buffer or inverter insertion position for each combination to determine a combination achieving the highest degree of improvement as an optimum combination, determine whether with respect to all the segments in the laid out circuit, determination of existence/non-existence of a path to which the optimization is to be applied is made or not, when the determination is made that determination with respect to the all the segments has been made, conducts timing analysis of the whole of the laid out circuit based on the determined combination of the type of buffer or inverter to be inserted and the insertion position, and when the determination is made as a result of the timing analyses that there is room for improvement in delay of the entire circuit, modifies the laid out circuit based on the determined combination of the type of buffer or inverter and the insertion position.

In the preferred construction, the layout processing means reflects the contents of the circuit change information and the inserted buffer information in the re-layout, as well as placing and routing gates so as to approximate to the circuit structure laid out by the initial layout on the remaining conditions as much as possible.

According to the second aspect of the invention, a delay optimization method of performing layout for receiving the input of circuit specification of a target circuit to conduct placing and routing a gate and optimization for modifying the circuit so as to satisfy delay constraints set for the target circuit, comprising the steps of:

receiving the input of circuit specification of the target circuit to conduct the initial layout based only on circuit information synthesized based on the circuit specification of the target circuit, as well as extracting wiring information at least including information on a resistance, a capacitance and topology of a wire, conducting optimization based on the results of the layout with reference to the wiring information extracted by the initial layout, as well as generating circuit change information regarding a changed part of the circuit generated when the circuit is modified by the optimization and inserted buffer information indicative of limitations on buffer insertion for optimization, and conducting re-layout with reference to the circuit change information and the inserted buffer information generated by the optimization.

The conducting optimization comprises the steps of determining existence/non-existence of a path for which optimization is to be conducted among the paths of the circuit laid out by the layout, selecting a wire as a target of optimization when the determination is made that there exists a path for which the optimization is to be conducted, determining the order of execution of optimization for a segment of the wire selected as a target of the optimization, calculating all the possible combinations of types and insertion positions of buffers or inverters to be inserted in order to satisfy the delay constraints set for the target circuit and calculating the degree of improvement in the delay constraints at a buffer or inverter insertion position for each combination to determine a combination achieving the highest degree of improvement as an optimum combination, and generating circuit change information obtained as a result of the change of the laid out circuit based on the determined combination of the type of buffer or inverter and insertion position.

The conducting optimization comprises the steps of determining existence/non-existence of a path for which optimization is to be conducted among the paths of the circuit laid out by the layout, selecting a wire as a target of optimization when the determination is made that there exists a path for which the optimization is to be conducted, determining the order of execution of optimization for a segment of the wire selected as a target of the optimization, calculating all the possible combinations of types and insertion positions of buffers or inverters to be inserted in order to satisfy the delay constraints set for the target circuit and calculating the degree of improvement in the delay constraints at a buffer or inverter insertion position for each combination to determine a combination achieving the highest degree of improvement as an optimum combination, determining whether with respect to all the segments in the laid out circuit, determination of existence/non-existence of a path to which the optimization is to be applied is made or not, when the determination is made that determination with respect to the all the segments has been made, conducting timing analyses of the whole of the laid out circuit based on the determined combination of the type of buffer or inverter and the insertion position, and when the determination is made as a result of the timing analysis that there is room for improvement in delay of the entire circuit, modifying the laid out circuit based on the determined combination of the type of buffer or inverter and the insertion position.

Also, the conducting re-layout may include a step of reflecting the contents of the circuit change information and the inserted buffer information, as well as placing and routing of gates so as to approximate to the circuit structure laid out by the initial layout on the remaining conditions as much as possible.

According to the third aspect of the invention, a computer readable memory having a computer program for controlling a computer system to execute layout for receiving the input of circuit specification of a target circuit to conduct placing and routing of a gate and optimization for modifying the circuit so as to satisfy delay constraints set for the target circuit, the computer program comprising the steps for controlling the computer system to:

receiving the input of circuit specification of the target circuit to conduct the initial layout based only on circuit information synthesized based on the circuit specification of the target circuit, as well as extracting wiring information at least including information on a resistance, a capacitance and topology of a wire, conducting optimization based on the results of the layout with reference to the wiring information extracted by the initial layout, as well as generating circuit change information regarding a changed part of the circuit generated when the circuit is modified by the optimization and inserted buffer information indicative of limitations on buffer insertion for optimization, and conducting re-layout with reference to the circuit change information and the inserted buffer information generated by the optimization.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
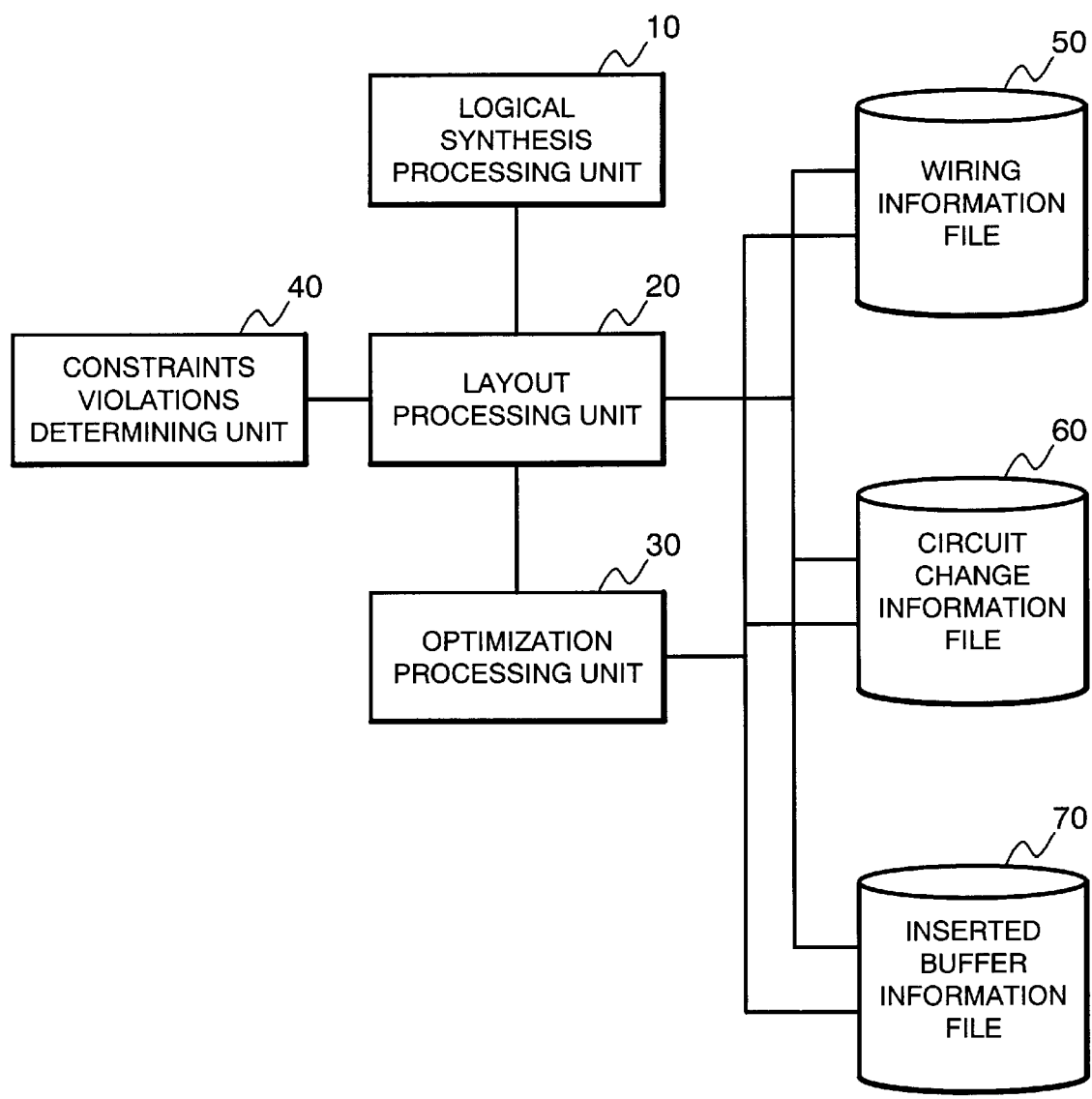
FIG. 1 is a block diagram showing structure of an optimization system according to one embodiment of the present invention.

FIG. 1 is a block diagram showing structure of a delay optimization system according to one embodiment of the present invention.

As illustrated in FIG. 1, the delay optimization system of the present embodiment includes a logic synthesis processing unit 10 for receiving the input of circuit specification of a target circuit described in hardware description language to conduct initial logic synthesis, a layout processing unit 20 for conducting layout of a target circuit based on circuit information subjected to the initial logic synthesis, an optimization processing unit 30 for conducting optimization with respect to a laid out circuit, a constraints violations determining unit 40 for determining whether a laid out circuit satisfies delay constraints set for a target circuit in question, a wiring information file 50 for storing wiring information generated by the layout processing unit 20, a circuit change information file 60 for storing circuit change information generated by the optimization processing unit 30, and an inserted buffer information file 70 for storing inserted buffer information generated also by the optimization processing unit 30. Illustrated in FIG. 1 is only a characteristic part of the structure of the present embodiment and illustration of the remaining common part is omitted. It is apparent that the system in practice includes an input device for receiving the input of various data and commands, a storage device for storing circuit specification of a target circuit, an output device for outputting processing results, and the like.

Of the above-described structure, the logic synthesis processing unit 10, the layout processing unit 20, the optimization processing unit 30 and the constraints violations determining unit 40 are implemented by computer-program-controlled CPU and internal memory such as RAM. A computer program for controlling a CPU, which is provided in a storage medium such as a magnetic disk or a semiconductor memory, is loaded from the storage medium to run each of the above-described function executing units. The wiring information file 50, the circuit change information file 60 and the inserted buffer information file 70 are stored in an external storage device such as a magnetic disk device or a semiconductor memory.

Although in the following, description will be made of optimization mainly for circuit delay, the present embodiment is applicable also to optimization to satisfy constraints on power consumption of a circuit and constraints on an circuit area.

The logic synthesis processing unit 10 receives the input of circuit specification of a target circuit to conduct logic synthesis and generate circuit information of a format to be used in the subsequent layout and optimization.

The layout processing unit 20 executes layout in which placing and routing of a gate is conducted based on the circuit information generated by the logic synthesis processing unit 10. The layout includes initial layout to be initially conducted based on circuit information received from the logic synthesis 10 and re-layout to be conducted after the optimization by the optimization processing unit 30. At the execution of the initial layout, wiring information is generated which is to be used in the subsequent optimization and re-layout, and is stored in the wiring information file 50. Wiring information here includes wire segment connection state (wiring topology), capacitance and resistance of each segment, etc. Wiring may be made by global routing processing or by detailed routing processing. Although wiring obtained by detailed routing has a higher precision than wiring obtained by global routing, execution of detailed routing processing by a layout device requires a lot of time for processing. Either routing is arbitrarily selected in consideration of a processing time and delay accuracy.

When a circuit laid out by the layout processing unit 20 fails to satisfy constraints such as delay, power consumption, area set in advance for the circuit, the optimization processing unit 30 conducts optimization of the circuit. At this time, the unit 30 employs the wiring information generated by the layout processing unit 20 to conduct optimization so as to satisfy the constraints, considering effects of the modification of the circuit exerted on the layout. Then, the unit 30 generates circuit change information and stores the same in the circuit change information file 60. The optimization processing unit 30 further generates inserted buffer information indicative of a buffer insertion position on a segment as layout constraints for re-layout in order to prevent the circuit change made in the optimization from worsening again by re-layout by the layout processing unit 20 and stores the generated information in the inserted buffer information file 70.

The constraints violations determining unit 40 determines whether a circuit laid out by the layout processing unit 20 satisfies the pre-set constraints. If the circuit satisfies them, the processing according to the present embodiment is completed and otherwise the optimization by the optimization processing unit 30 and the re-layout by the layout processing unit 20 are repeated.

Figure 2:
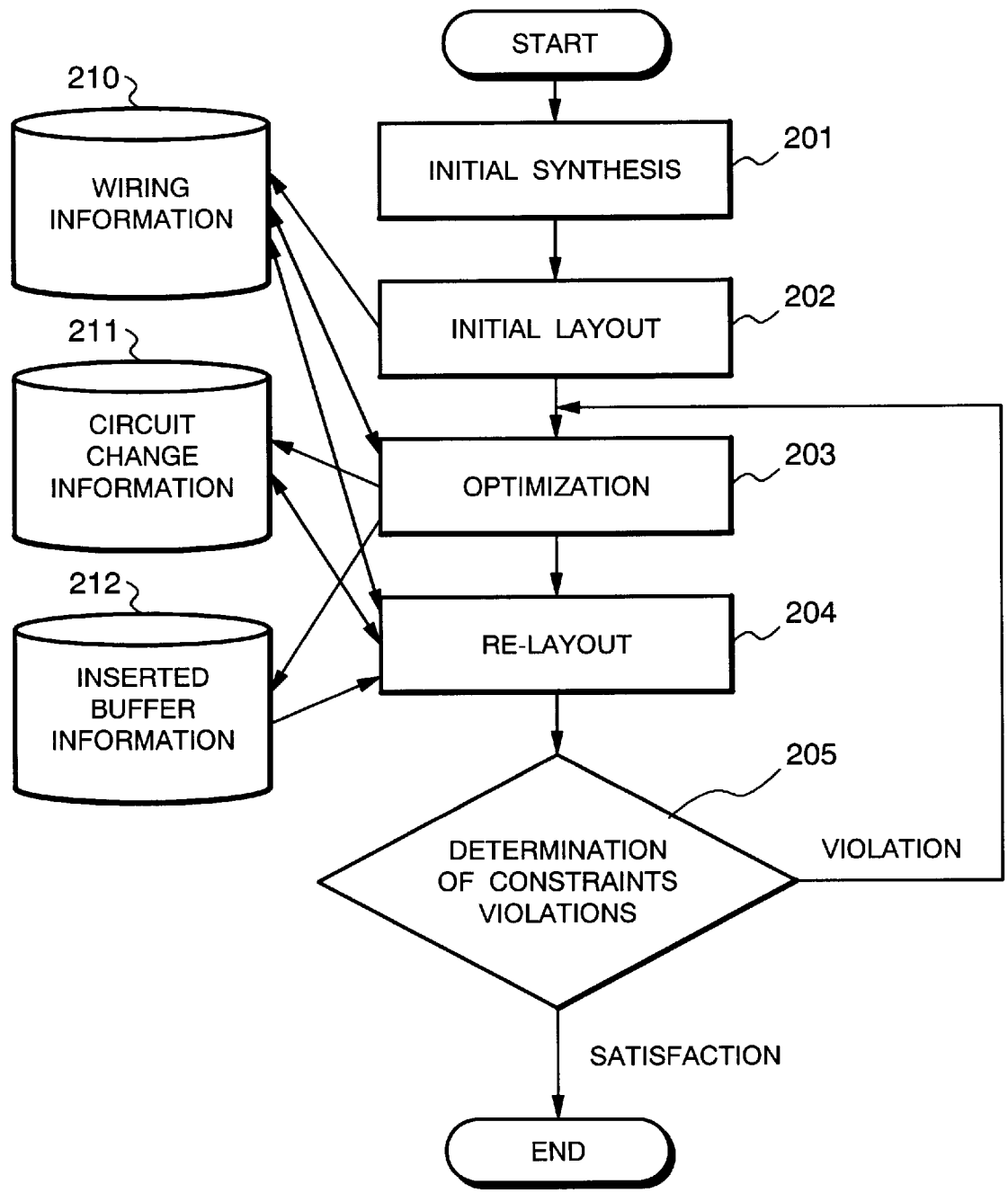
FIG. 2 is a flow chart showing operation of the optimization system of the present embodiment.

Next, description will be made of operation of the present embodiment with reference to the flow chart illustrated in FIG. 2.

First, the logic synthesis processing unit 10 receives the input of circuit specification of a target circuit to conduct initial logic synthesis (Step 201). Next, the layout processing unit 20 receives the input of the circuit information which is initially synthesized by the logic synthesis processing unit 10 to conduct initial layout (Step 202).

At this time, the unit 20 extracts wiring information 210 (resistance, capacitance, wiring topology, etc.) of the circuit generated by the initial layout and stores the information in the wiring information file 50. The constraints violations determining unit 40 then determines whether the circuit laid out by the layout processing unit 20 satisfies constraints set in advance for the target circuit and if the circuit fails to satisfy them, the optimization processing unit 30 conducts necessary optimization (Step 203).

At this time, the optimization processing unit 30 conducts optimization with reference to the wiring information 210 stored in the wiring information file 50, as well as rewriting the wiring information 210 according to the change made by the optimization. In addition, the unit 30 generates circuit change information 211 indicative of local change of a circuit by the optimization and stores the information in the circuit change information file 60. The unit 30 also generates inserted buffer information 212 which places a limitation on the subsequent re-layout by the layout processing unit 20 and stores the information in the inserted buffer information file 70. The layout processing unit 20 then conducts re-layout while reflecting the results of the optimization executed by the optimization processing unit 30 (Step 204).

This layout is conducted based on the results of the initial layout of Step 202 only with respect to a part modified by the optimization. When the inserted buffer information 212 designates buffer and inverter insertion position, the layout processing unit conducts layout so as to satisfy such constraints. The constraints violations determining unit 40 then determines whether the re-laid out circuit satisfies the constraints set for the target circuit (Step 205).

Then, if the constraints are violated, the routine restarts from the optimization of Step 203 conducted by the optimization processing unit 30 and when all the constraints are satisfied, processing is completed.

Detailed description will be next made of the optimization at Step 203 and the re-layout at Step 204.

Figure 3:
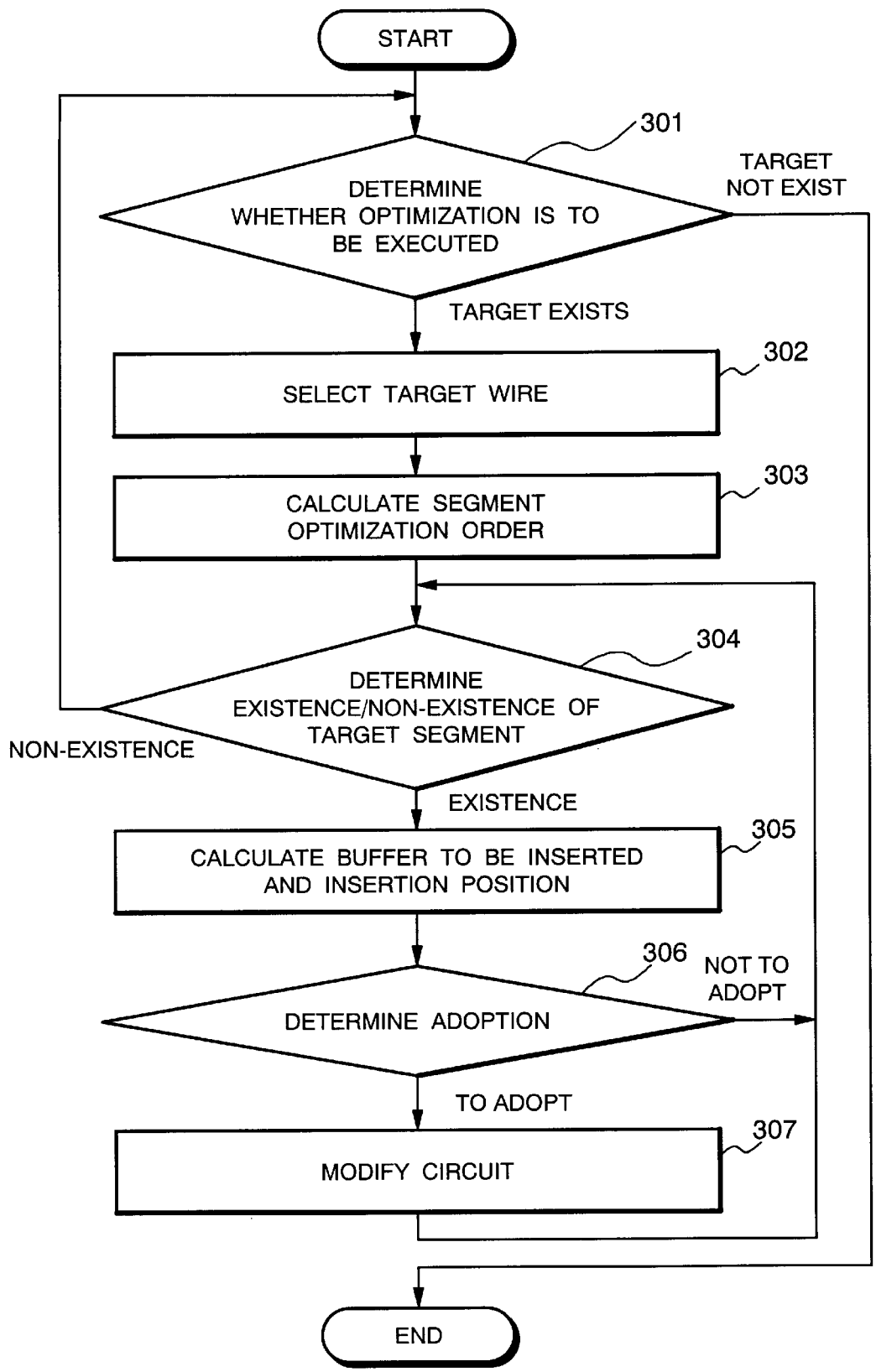
FIG. 3 is a flow chart showing a detailed flow of optimization of the present embodiment.
Figure 4:
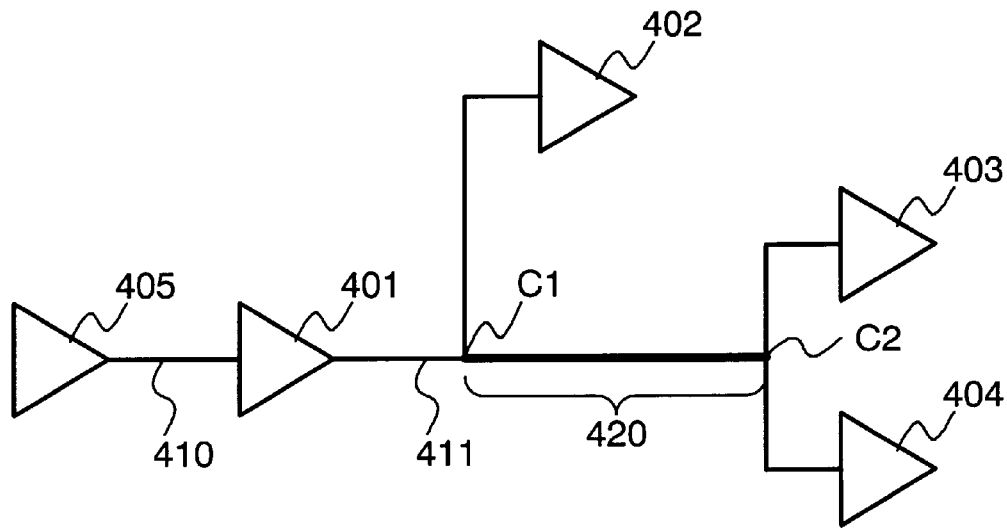
FIG. 4 is a circuit diagram of a target circuit for use in explaining the optimization according to the present embodiment, which shows a state of completion of initial layout.

FIG. 3 is a flow chart of buffer insertion by the optimization processing unit 30, taking insertion of a new buffer into a circuit as an example. FIG. 4 is a circuit diagram showing an example of an initially laid out circuit which is to be optimized. In the circuit of FIG. 4, a gate 405 and a gate 401 are connected via a wire 410 and the gate 401 is connected with a gate 402, and gates 403 and 404 via a wire 411 which branches as illustrated in the figure. In addition, in the shown circuit, a segment 420 denoted by a thick straight line from a branching point C1 to a branching point C2 of the wire 411 is the worst critical path.

As described above, when the constraints violations determining unit 40 determines that there exists a constraints violating path in a circuit initially laid out by the layout processing unit 20 and that there is room for optimization, the optimization processing unit 30 executes optimization (Step 301). Determination whether there is room for optimization is made by trying to insert a buffer into a wire on a worst critical path.

Here, a path violating constraints (hereinafter referred to as critical path) is a path which passes through a gate whose slack ((required time (for delay constraints))−(arrival time)) takes a negative value. A worst critical path is a path whose slack takes a minimum negative value. If insertion of a buffer into a wire on a worst critical path fails to improve delay, processing is completed because there is no room for optimization.

Next, select a wire to be optimized among the wires of the circuit in question (Step 302). Then, determine the processing order of segments in which buffers are inserted (Step 303). Various ways are possible to determine a processing order, such as a descending order of wire capacitance, a breadth first search order from a segment connected to a gate on the signal source side to a segment connected to a gate on the sink side to which signal flows, and their reverse orders.

Next, determine whether there exists a segment whose optimization is yet to be tried among the target wires selected at Step 302 (Step 304). When optimization is tried with respect to all the segments and no segment exists whose processing is yet to be processed, the routine returns to the determination processing of Step 301 to determine whether optimization is to be conducted in order to search for a wire whose optimization is to be executed. On the other hand, when there exists a segment whose optimization is yet to be tried, the routine goes to Step 305.

Next, calculate an insertion position of a buffer to be inserted in a selected segment to try buffer insertion (Step 305). For example, one of the buffer insertion position calculation manners is determining a type of buffer to be inserted and an insertion position on the assumption that one buffer is to be inserted into one segment in each optimization, and the other is determining type and insertion position of buffers to be inserted on the assumption that a plurality buffers are to be inserted into a segment at equal intervals in each optimization. These determination manners will be described in the following.

As the determination manner employed for inserting one buffer into a segment per processing, there are two kinds of methods depending on how a buffer is inserted.

Figure 5:
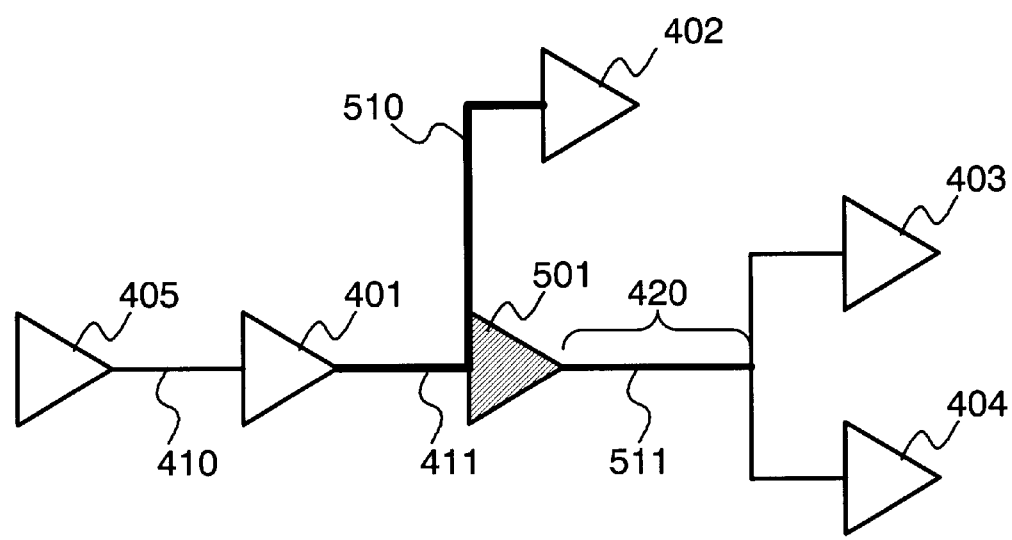
FIG. 5 is a circuit diagram of the target circuit for use in explaining the optimization according to the present embodiment, which shows a state of insertion of one buffer into a path other than a worst critical path.
Figure 6:
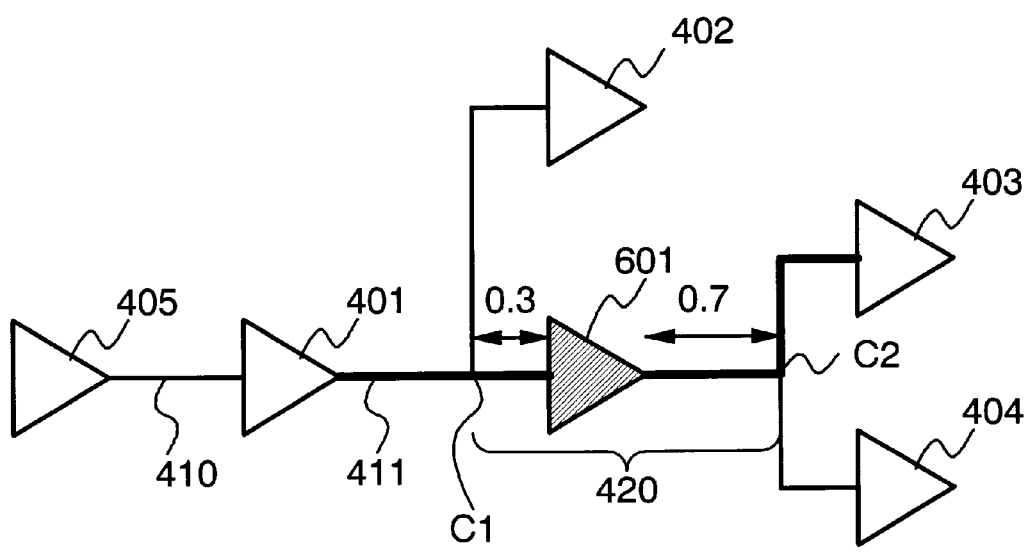
FIG. 6 is a circuit diagram of the target circuit for use in explaining the optimization according to the present embodiment, which shows a state of insertion of one buffer into a worst critical path.

FIG. 5 is a diagram showing buffer insertion in the circuit illustrated in FIG. 4 such that a worst critical path is isolated (isolation) when a wire length between a gate on the source side and a gate on the sink side on the worst critical path is short and the remaining wires are long. FIG. 6 is a diagram showing buffer insertion into a segment on a worst critical path in the circuit illustrated in FIG. 4 (partition).

Isolation illustrated in FIG. 5 is employed when a segment in which a buffer is inserted is not on a worst critical path. In a case of insertion of one buffer, it is the best way to insert a buffer 501 in a branching point (the branching point C1 in FIG. 4) on the source side of the segment. This is because the worst critical path in question is assumed to remain a worst critical path even after optimization.

Partition illustrated in FIG. 6 is employed in a case of buffer insertion into a segment on a worst critical path. Resistance and capacitance of a segment after a buffer is inserted therein are calculated by dividing resistance and capacitance of the original segment according to the position of the segment on which the buffer in question is placed.

As illustrated in FIG. 6, when a buffer 601 is inserted in a position which divides a segment 420 by a ratio of 3 to 7, assuming the resistance and the capacitance of the original segment 420 to be R and C, the resistance and the capacitance between a branching point C1 and the buffer 601 after the division will be 0.3 R and 0.3 C, respectively, and the resistance and the capacitance between the buffer 601 and a branching point C2 will be 0.7 R and 0.7 C, respectively. Buffer insertion position into a segment on a worst critical path is calculated by the following equation (10).

In the following equation, a represents a buffer insertion position. In addition, α source gate of a target wire in which a buffer is to be inserted is represented as g, an inserted buffer as BUF and a fanout gate of BUF on a worst critical path as out.

$$\alpha = \frac{1}{(\beta_m + \beta_{BUF})} \tag{10}$$

-continued $$\left( \frac{k}{R_{i,j}C_{i,j}} + \frac{\beta_m CLO(i) - \beta_{BUF} C_{iBUF}}{C_{i,j}} - \beta_{BUF} \frac{\sum_{S_{o,p} \in TFI(i,j)} R_{o,p}}{R_{i,j}} \right)$$

where the following equation holds:

$$\beta_m = \log\left(\frac{Vdd}{Vdd - Vt_m}\right) \quad \text{(rise)} \tag{11}$$

$$= \log\left(\frac{Vdd}{Vt_m}\right) \quad \text{(fall)}$$

CLO(i) represents a sum of capacitances of wire segments on the sink side connected to $n_i$. Furthermore, let the segment 420 be a one-dimensional coordinate, a coordinate value of the branching point C1 be "0", a coordinate value of the branching point C2 be "1", let a buffer position α be represented as a coordinate value of segment 420 and let the following equations hold.

$k_s$=(propagation delay of g when α=0)−(propagation delay of g when α=1)

$k_{BUF}$=(propagation delay of BUF when α=0)−(propagation delay of fanout of BUF when α=1)

$k_{out}$=(propagation delay of out when α=0)−(propagation delay of fanout of out when α=1)

$k=k_g+k_{BUF}+k_{out}$

TFI (i,j) represents a branching point, a terminal or the like of $S_{ij}$ in the transitive fanin direction.

The above equations are for obtaining a partial differential function of a buffer insertion position α based on a slack ((required time)−(arrival time)) calculated using α and calculating such a that makes the obtained expression equal "0". At this time, the slack attains a maximum value and the buffer insertion position α will be most suitable position for buffer insertion. Since 0≦α≦1, it is assumed that when α≦0, then α=0 and when 1≦α, then α=1. β is a coefficient calculated by the equation (2).

Description will be next made of insertion of plural buffers into a segment at equal intervals in each optimization. In this method, buffers are located on a predetermined segment at equal intervals to regard a pattern that improves delay most as an optimization candidate. At this time, a user defines only a minimum interval between buffers to insert buffers within that range. In a case of insertion of plural buffers, it is possible to employ a gate as a gate in which an inverter is also to be inserted, on condition that the number of inverters to be inserted is an even number. Assuming, for example, that a wire length of a segment is 3 mm and a minimum interval of buffers to be inserted is 1 mm, an optimization candidate will be decided after insertions of two buffers, three buffers and two inverters are tried.

The above described insertion position of one or plural buffers is calculated with respect to all the buffers and inverters prepared in a library. When a buffer or an inverter to be inserted is limitedly designated, insertion position will be calculated with respect to a limited buffer or inverter. Among delay reductions achieved by combination patterns of determined types and insertion positions of buffers, a pattern achieving a maximum reduction is taken as an optimization candidate. At this time, the degree of delay improvement is checked by calculating a delay of only a changed part of the circuit and timing analysis of the entire circuit is unnecessary.

Optimization by re-sizing of a gate will be described. Here, when load driven by a gate is large in the optimization 203, delay is improved by re-sizing the gate. Among gates existing on critical paths of the circuit, gates as re-sizing targets are sequentially selected, starting from a gate whose delay improvement effect is expected to be the largest according to a fixed determination basis when a delay of the gate in question is large and when a wire capacitance, a wire resistance and a wire delay of a wire on the output side of the gate in question are large.

Figure 7:
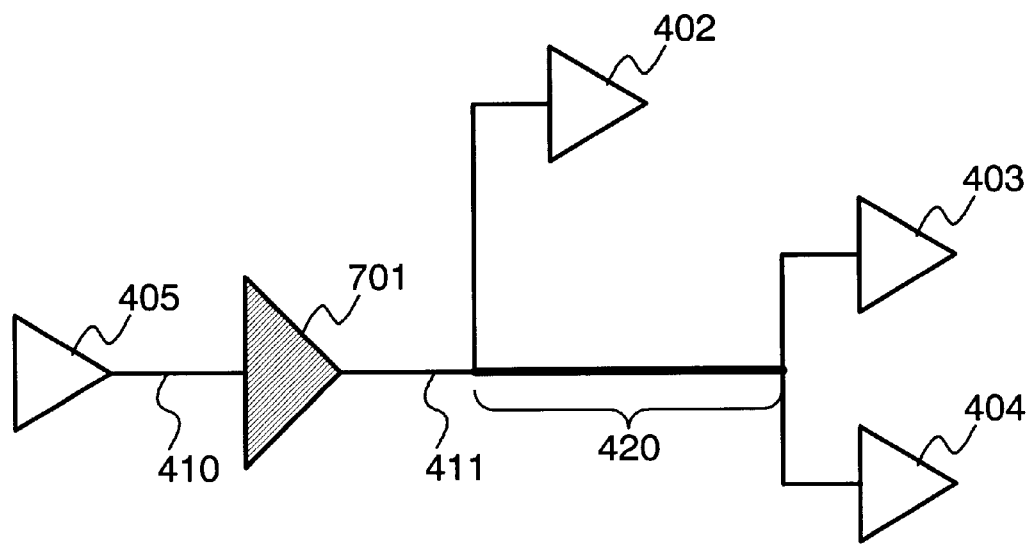
FIG. 7 is a circuit diagram of the target circuit for use in explaining the optimization according to the present embodiment, which shows a state of re-sizing of a gate.

FIG. 7 shows re-sizing of the gate 401 in the circuit illustrated in FIG. 4. As shown in the figure, the gate 401 has been replaced by a gate 701 which is logically equivalent and has a greater drivability. If the gate is replaced by the new one, it is highly possible in re-layout to locate the new gate 701 at a position of the previous gate 401. Topology and position of wires connected to the gate 701 are therefore regarded to vary little. Thus, delay calculation in a case where the gate 401 is replaced by the gate 701 is conducted by using layout information such as wire capacitances and wire resistances of the wires 410 and 411 of the original circuit.

When there exist plural gates logically equivalent to the gate 401, replacement with each of all the gates is tried to select an optimum gate in terms of the degree of delay improvement, increase or decrease of a location area, etc. When no suitable gate replacement candidate is found or when there remains a critical path in the circuit after the replacement of a gate, gate re-sizing will be further tried with respect to other gate.

While in the foregoing, description has been made of optimization by buffer insertion and optimization by re-sizing of a gate, these techniques can be arbitrarily combined to execute optimization in practice. For example, after re-sizing of a gate, buffer insertion may be further executed to conduct optimization. It is also possible to insert one buffer into a predetermined path and then cancel the insertion of the buffer to newly insert plural buffers.

After thus calculating a buffer to be inserted and an insertion position at Step 305, timing analysis of the entire circuit are made in a case where an obtained buffer insertion pattern is executed. Then, if there is room for improving a maximum delay, the insertion pattern in question is adopted (Step 306) to modify the circuit according to the insertion pattern (Step 307).

At this time, buffer insertion position, type of buffer to be inserted are output as inserted buffer information 212. Buffer insertion position is represented not by coordinate information of the entire circuit in question but by a segment on which a buffer in question is to be located and a coordinate value obtained with the segment expressed in a one-dimensional coordinate, as has been described with reference to FIG. 6. When no improvement in delay is achieved depending on an insertion pattern calculated at Step 305, the insertion pattern is canceled to return to the determination processing of Step 304.

The layout processing unit 20 conducts re-layout with respect to thus optimized circuit.

When optimization is conducted by the insertion of buffers by the optimization processing unit 30, a relative buffer insertion position calculated at Step 305 of FIG. 3 and stored in the insertion buffer information file 70 is taken as a constraint for layout. The layout processing unit 20 conducts placing buffers and re-layout based on the insertion buffer information. For the re-layout, the engineering change order (ECO) technique, for example, can be used, in which only a changed part of a circuit is partially laid out. After the placing buffers, re-routing is made so as to substantially coincide with the pre-optimization wiring.

In the buffer insertion example illustrated in FIG. 5, wiring obtained after the insertion of the gate 501 will take over the topology of the wire 411 except for the division of the wire 411 into a wire 510 and a wire 511 at the part of the gate 501.

In the buffer insertion example illustrated in FIG. 6, since the buffer 601 is placed at a position to divide the segment 420 by a ratio of 3 to 7, the buffer 601 is placed also in layout by the layout processing unit 20 at a position to divide the segment 420 by a ratio of 3 to 7. Inserted buffer information used at this time includes a type of the buffer 601 to be inserted, the segment 420 of a wire in which the buffer 601 is to be inserted, and an insertion position of the buffer 601 denoted as a coordinate value obtained with the segment 420 in which the buffer 601 is inserted expressed in a one-dimensional coordinate (for example, "0.3", which is a distance from the branching point C1).

Re-routing is then made to correspond to the division of the segment 420. When an obstacle such as other gate already exists at a position at which a buffer is to be located, the buffer is placed at a free space near the position. In this case, re-routing is conducted according to the change of the buffer locating position.

In the gate re-sizing example illustrated in FIG. 7, the new gate 701 is located at a position where the gate 401 is used to be placed before re-sizing, and re-routing is made so as to coincide with the pre-re-sizing wiring. In a case where the new gate can not be placed at the gate pre-re-sizing position because the size of the gate is increased due to re-sizing of the same, the gate 701 is re-placed at a free space near the position to conduct re-routing according to the change of the placing position of the gate 701.

Experiments have been done for the present embodiment in order to evaluate the effects of the present invention. Data shows experimental results of three types of circuits designed to have a wire width of 0.35 μm, at which value a ratio of an wire RC delay to the whole delay is expected to start increasing. In each circuit of DATA 1 to 3, neither placing nor routing in consideration of delay constraints is conducted in initial layout. As the delay constraints, half a maximum delay time is set at the end of a path as a required time. Circuit specification data is as shown in Table 1. Table 1 shows the number of gates and the utilization rate of gates in the chip.

TABLE 1

| Data | the number of gates | the gate utilization rate [%] |
|---|---|---|
| DATA 1 | 5012 | 11.4 |
| DATA 2 | 16538 | 51.1 |
| DATA 3 | 19945 | 49.5 |

Experimental results of optimization conducted with respect to the above-described circuits DATA 1 to 3 are shown in Table 2. Table 2 shows maximum delays at the respective stages of pre-optimization, post-optimization pre-re-layout and post-optimization post-re-layout. Numeric values in parentheses each represents a ratio of a maximum delay before optimization to a maximum delay at other stage.

TABLE 2

| | Maximum delay [ns] | | |
|---|---|---|---|
| data | pre-optimization | post-optimization pre-layout | post-optimization post-layout |
| DATA 1 | 16.42 | 13.16(0.801) | 13.08(0.797) |
| DATA 2 | 24.63 | 20.68(0.840) | 21.13(0.858) |
| DATA 3 | 49.91 | 41.92(0.840) | 42.10(0.844) |

It can be seen from Table 2 that the optimization according to the present embodiment enables optimization of about 15 to 20 percent of a maximum delay. It is also seen that since a difference in delay between a pre-layout delay and a post-layout delay is small, estimation of a delay value by the optimization is accurate.

As described in the foregoing, since the present invention considers means for optimization by using wiring information obtained by initial layout of a target circuit, optimum buffer type and insertion position for improving delay can be calculated at a high speed.

In addition, even when wiring needs to be made detouring an obstacle, since re-routing as approximate to a circuit diagram obtained by the initial layout as possible is conducted after optimization, a difference between a delay value estimated at the execution of the optimization and a real delay value obtained after routing can be minimized.

Wiring information obtained by the initial layout may include, other than the above-described resistance, capacitance and topology of a wire, the wire congestion. In an actual circuit, even if a buffer is intended to be inserted into a part where wiring is highly congested, the buffer can not ultimately be placed at an intended position and therefore will be placed a little away from the intended place. This makes estimation of a delay made at the execution of optimization inaccurate.

It is therefore effective to specify a place with the high wire congestion in advance not to insert a buffer into such a place. The wire congestion can be obtained, for example, by displaying a circuit diagram on a display unit at the execution of the initial layout and determining and inputting a value indicative of the wire congestion by a user based on the displayed circuit diagram. Possible implementation means in optimization is, for example, to avoid, in the processing shown at Step 303 of FIG. 3 for calculating the segment optimization order, listing segments which pass through a place with the wire congestion as optimization targets, thereby preventing optimization for a wire of the high wire congestion.

Figure 8:
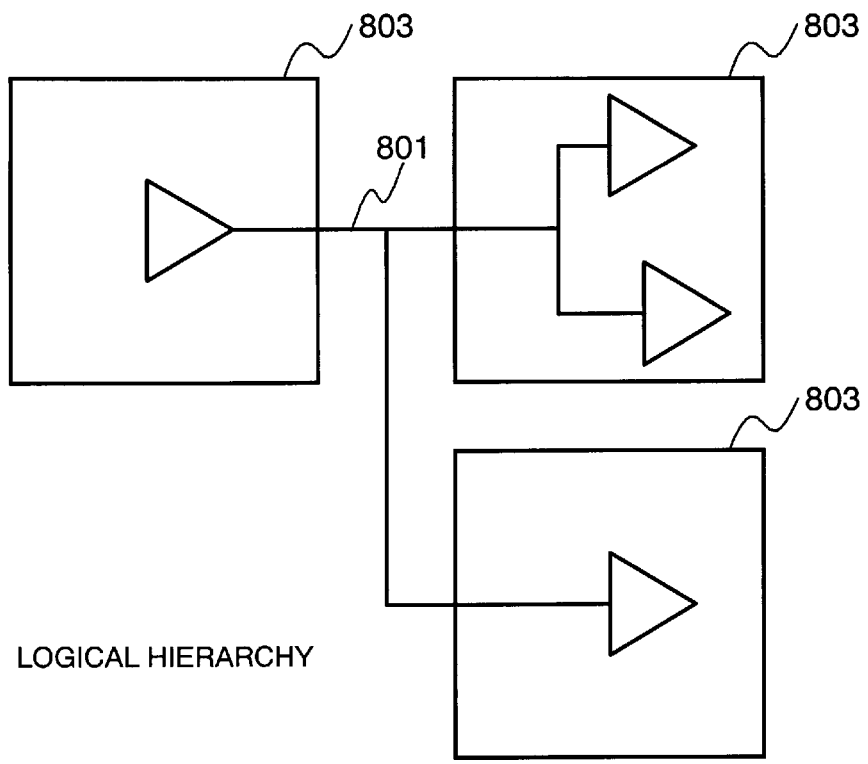
FIG. 8A is a block diagram showing an example of circuit structure having a logical hierarchy structure.
FIG. 8B is a circuit diagram showing layout made not corresponding to the logical hierarchy illustrated in FIG. 8A.
Figure 8:
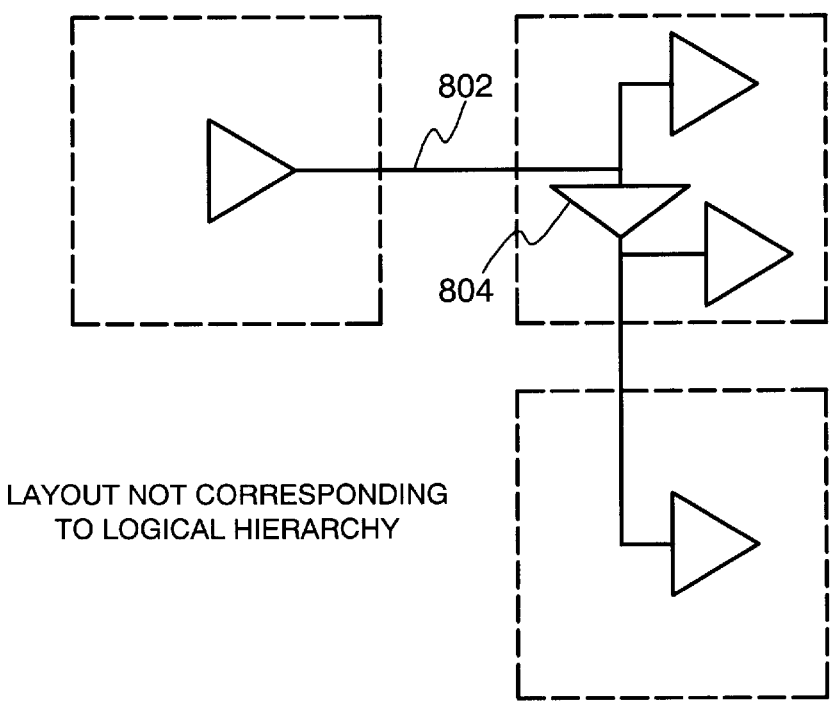
Figure 9:
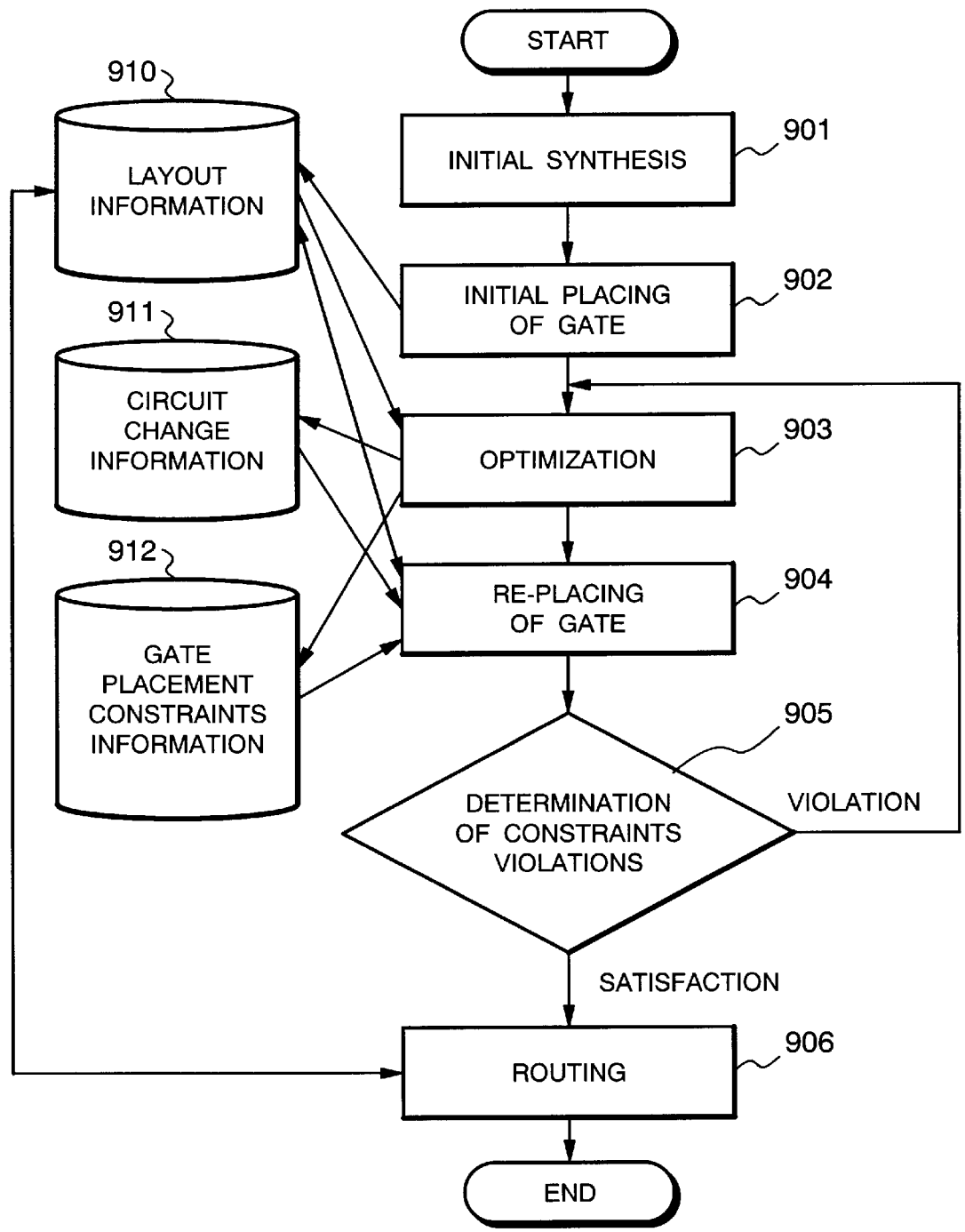
FIG. 9 is a flow chart showing operation by a conventional optimization system.
Figure 10:
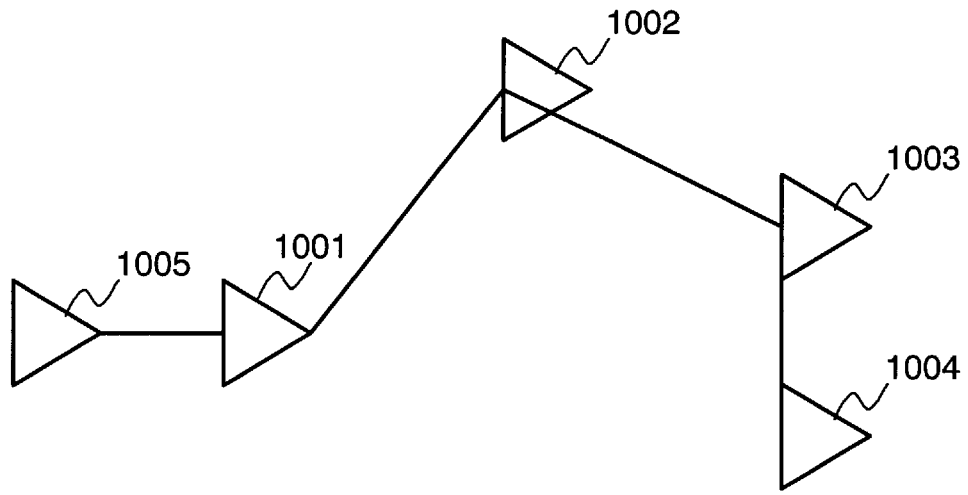
FIG. 10 is a diagram showing an example of a minimum spanning tree for use in optimization by the optimization system illustrated in FIG. 9.
Figure 13:
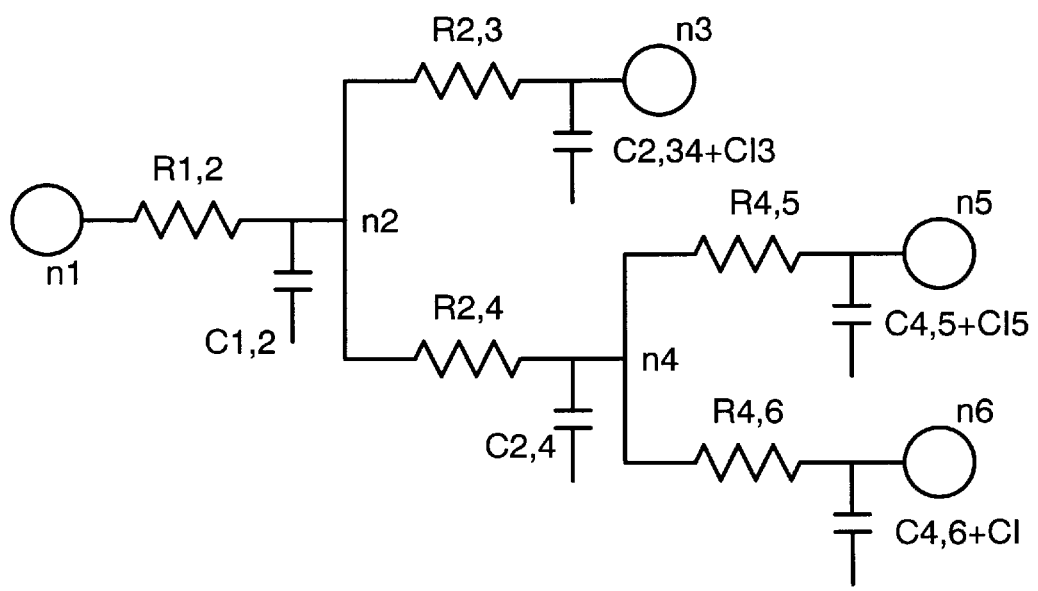
FIG. 13 is a diagram showing an example of Elmore delay calculation for use in optimization conducted by the optimization system shown in FIG. 12.
Figure 11:
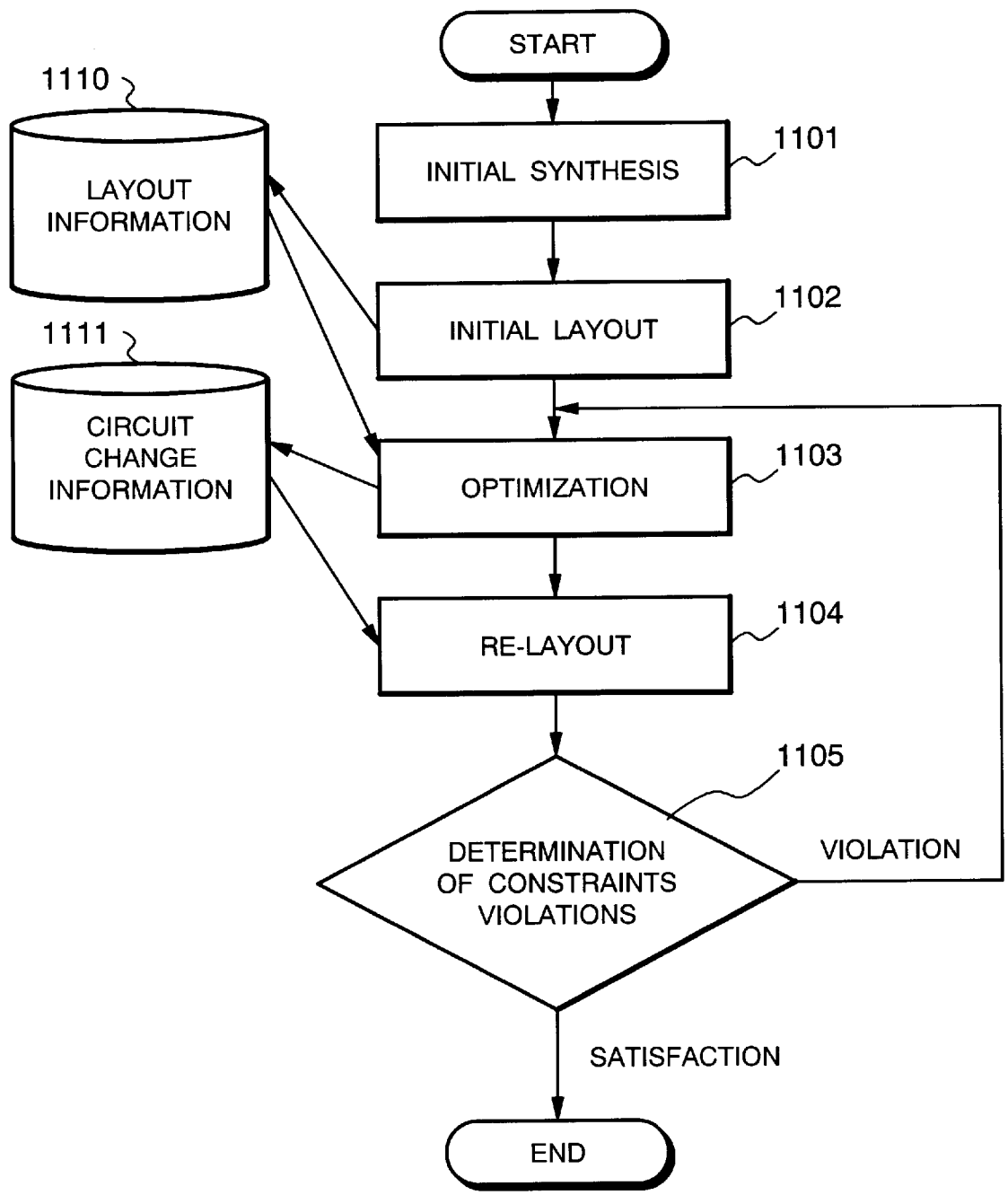
FIG. 11 is a flow chart showing operation by another conventional optimization system.
Figure 12:
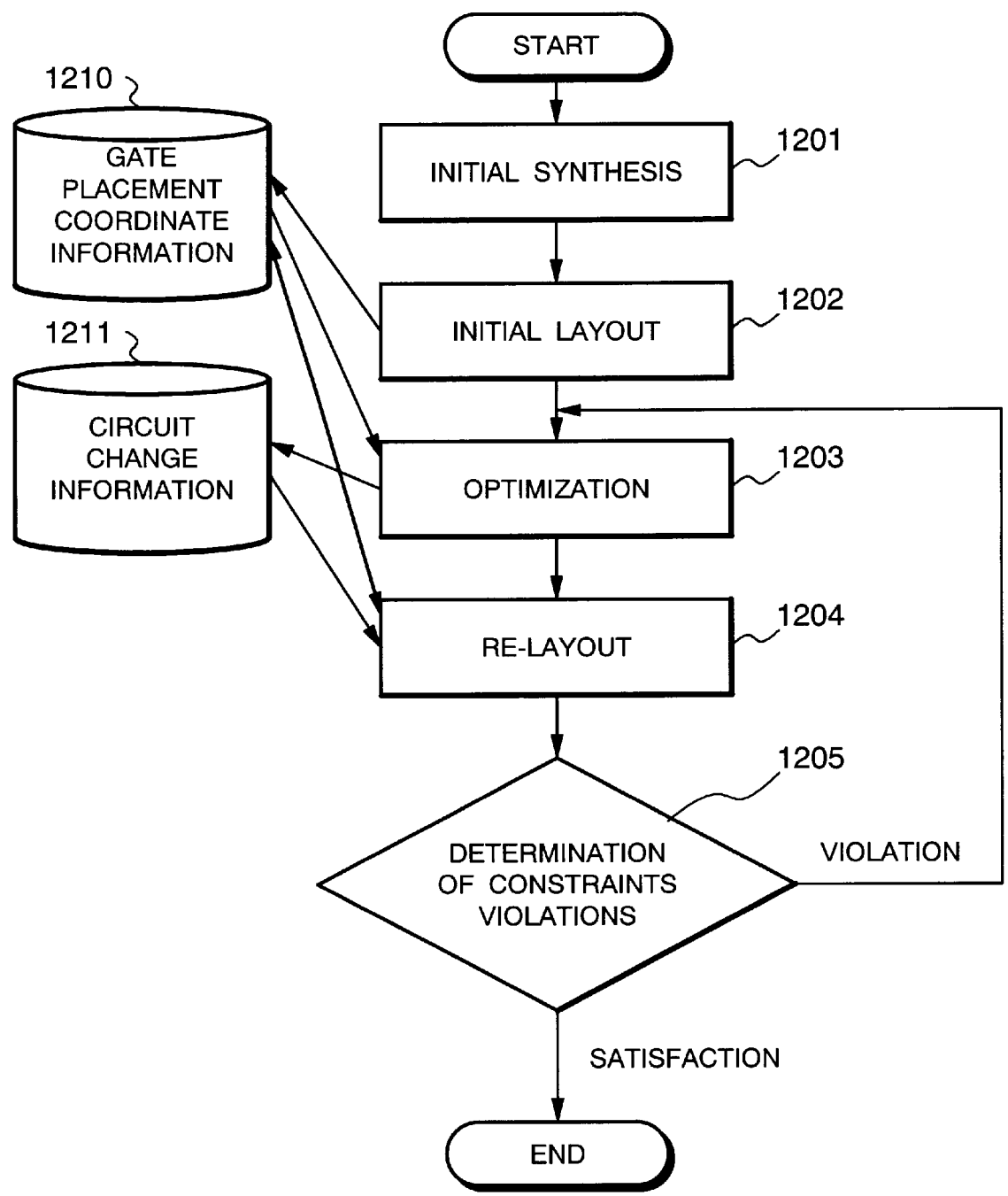
FIG. 12 is a flow chart showing operation by still another conventional optimization system.

Moreover, when a connection relationship of gates in a target circuit has a hierarchy structure, layout is made for each hierarchy and a wire among logical hierarchies is made to pass the same place as the section of the logical hierarchies. Taking the circuit structures illustrated in FIGS. 8A and 8B as examples, a wire 801 bridging logical hierarchies shown in FIG. 8A and a wire 802 shown in FIG. 8B, which is a wire laid out, differ from each other in a section of a gate among the logical hierarchies. As a result, when a buffer 804 is inserted as illustrated in FIG. 8B, for example, the actually routed circuit fails to correspond to the logical hierarchy 810. This problem can be avoided by hierarchical layout made by the layout processing unit 20 as mentioned above.

Although the present embodiment has been described mainly with respect to optimization for a circuit delay, it will be understood that the present embodiment is also applicable to optimization to satisfy constraints on power consumption of a circuit and a circuit area.

As described in the foregoing, the delay optimization device and the method therefor of the present invention employ wiring information obtained by the initial layout to conduct optimization taking circuit layout into account, whereby a delay value and power consumption of the circuit can be accurately calculated. Furthermore, provision of layout constraints for the re-layout enables the re-layout to be conducted approximately to wiring information assumed at the execution of optimization (wiring information at the initial layout), thereby minimizing a difference between a delay value estimation result obtained at the time of optimization and a delay value obtained after re-layout. This avoids iterations of optimization to reduce a required time for circuit design.

In addition, by appropriately and efficiently conducting delay optimization, the present invention is allowed to appropriately and efficiently execute such optimization as reduction of power consumption and circuit size.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A delay optimization system which performs layout for receiving an input of circuit specification of a target circuit to conduct placing and routing of a gate and optimization for modifying a circuit so as to satisfy delay constraints set for said target circuit, comprising:

layout processing means for receiving the input of circuit specification of said target circuit to conduct said layout, as well as extracting wiring information at least including information on a resistance, a capacitance and topology of a wire;

optimization processing means for conducting optimization based on the layout by said layout processing means with reference to said wiring information extracted by said layout processing means, as well as generating circuit change information regarding a changed part of the circuit generated when the circuit is modified by optimization and inserted buffer information indicative of limitations on buffer insertion for optimization; and constraints violations determining means for determining whether a circuit generated as a result of the layout by said layout processing means satisfies delay constraints set for said target circuit; wherein said layout processing means conducts before the execution of the optimization by said optimization processing means, an initial layout based only on circuit information synthesized based on the circuit specification of said target circuit, and after the execution of the optimization by said optimization processing means, a re-layout with reference to said circuit change information and said inserted buffer information generated by said optimization processing means.

2. The optimization system as set forth in claim 1, wherein said optimization processing means determines existence/non-existence of a path for which optimization is to be conducted among paths of the circuit laid out by said layout processing means, selects a wire as a target of optimization when a determination is made that there exists a path for which said optimization is to be conducted, determines an order of execution of optimization for a segment of the wire selected as a target of said optimization, determines a type of buffer or inverter to be inserted and an insertion position so as to satisfy the delay constraints set for said target circuit, and generates circuit change information obtained as a result of modification of said laid out circuit based on said determined type of buffer or inverter and insertion position.

3. The optimization system as set forth in claim 1, wherein said optimization processing means determines existence/non-existence of a path for which optimization is to be conducted among paths of the circuit laid out by said layout processing means, selects a wire as a target of optimization when a determination is made that there exists a path for which said optimization is to be conducted, determines an order of execution of optimization for a segment of the wire selected as a target of said optimization, calculates all possible combinations of types and insertion positions of buffers or inverters to be inserted in order to satisfy the delay constraints set for said target circuit and calculates a degree of improvement in said delay constraints at a buffer or inverter insertion position for each combination to determine a combination achieving a highest degree of improvement as an optimum combination, and generates circuit change information obtained as a result of a change of said laid out circuit based on said determined type of buffer or inverter and insertion position.

4. The optimization system as set forth in claim 1, wherein said optimization processing means determines existence/non-existence of a path for which optimization is to be conducted among paths of the circuit laid out by said layout processing means, selects a wire as a target of optimization when a determination is made that there exists a path for which said optimization is to be conducted, determines an order of execution of optimization for a segment of the wire selected as a target of said optimization, determines a type of buffer or inverter to be inserted and an insertion position so as to satisfy the delay constraints set for said target circuit, determines whether with respect to all the segments in said laid out circuit, determination of existence/non-existence of a path to which said optimization is to be applied is made or not, when a determination is made that O. determination with respect to said all the segments has a been made, conducts timing analysis of the whole of said laid out circuit based on said type of buffer or inverter to be inserted and insertion position, and when a determination is made as a result of said timing analysis that there is room for improvement in delay of said entire circuit, modifies said laid out circuit based on said determined type of buffer or inverter and insertion position.

5. The optimization system as set forth in claim 1, wherein said optimization processing means
determines existence/non-existence of a path for which optimization is to be conducted among paths of the circuit laid out by said layout processing means,
selects a wire as a target of optimization when a determination is made that there exists a path for which said optimization is to be conducted,
determines an order of execution of optimization for a segment of the wire selected as a target of said optimization,
calculates all possible combinations of types and insertion positions of buffers or inverters to be inserted in order to satisfy the delay constraints set for said target circuit and calculates a degree of improvement in said delay constraints at a buffer or inverter insertion position for each combination to determine a combination achieving the highest degree of improvement as an optimum combination,
determines whether with respect to all segments in said laid out circuit, determination of existence/non-existence of a path to which said optimization is to be applied is made or not,
when a determination is made that determination with respect to said all the segments has been made, conducts timing analyses of the whole of said laid out circuit based on said determined combination of the type of buffer or inverter to be inserted and the insertion position, and
when a determination is made as a result of said timing analysis that there is room for improvement in delay of said entire circuit, modifies said laid out circuit based on said determined combination of the type of buffer or inverter and the insertion position.

6. The optimization system as set forth in claim 1, wherein
said layout processing means reflects the contents of said circuit change information and said inserted buffer information in said re-layout, as well as placing and routing of gates so as to approximate to the circuit structure laid out by said initial layout on the remaining conditions as much as possible.

7. A delay optimization method of performing layout for receiving an input of circuit specification of a target circuit to conduct placing and routing of a gate and optimization for modifying a circuit so as to satisfy delay constraints set for said target circuit, comprising the steps of:
receiving the input of circuit specification of said target circuit t to conduct said initial layout based only on circuit information synthesized based on the circuit specification of the target circuit, as well as extracting wiring information at least including information on a resistance, a capacitance and topology of a wire;
conducting optimization based on the results of said layout with reference to said wiring information extracted by said initial layout, as well as generating circuit change information regarding a changed part of the circuit generated when the circuit is modified by the optimization and inserted buffer information indicative of limitations on buffer insertion for optimization; and
conducting re-layout with reference to said circuit change information and said inserted buffer information generated by said optimization.

8. The delay optimization method as set forth in claim 7, wherein
said conducting optimization comprises the steps of:
determining existence/non-existence of a path for which optimization is to be conducted among paths of the circuit laid out by said layout,
selecting a wire as a target of optimization when the determination is made that there exists a path for which said optimization is to be conducted,
determining an order of execution of optimization for a segment of the wire selected as a target of said optimization,
determining a type of buffer or inverter to be inserted and an insertion position so as to satisfy the delay constraints set for said target circuit, and
generating circuit change information obtained as a result of the change of said laid out circuit based on said determined type of buffer or inverter and insertion position.

9. The delay optimization method as set forth in claim 7, wherein
said conducting optimization comprises the steps of:
determining existence/non-existence of a path for which optimization is to be conducted among paths of the circuit laid out by said layout,
selecting a wire as a target of optimization when the determination is made that there exists a path for which said optimization is to be conducted,
determining an order of execution of optimization for a segment of the wire selected as a target of said optimization,
calculating all possible combinations of types and insertion positions of buffers or inverters to be inserted in order to satisfy the delay constraints set for said target circuit and calculating a degree of improvement in said delay constraints at a buffer or inverter insertion position for each combination to determine a combination achieving a highest degree of improvement as an optimum combination, and
generating circuit change information obtained as a result of a change of said laid out circuit based on said determined combination of the type of buffer or inverter and insertion position.

10. The delay optimization method as set forth in claim 7, wherein
said conducting optimization comprises the steps of:
determining existence/non-existence of a path for which optimization is to be conducted among paths of the circuit laid out by said layout,
selecting a wire as a target of optimization when a determination is made that there exists a path for which said optimization is to be conducted,
determining an order of execution of optimization for a segment of the wire selected as a target of said optimization,
determining a type of buffer or inverter to be inserted and an insertion position so as to satisfy the delay constraints set for said target circuit,
determining whether with respect to all segments in said laid out circuit, determination of existence/non-existence of a path to which said optimization is to be applied is made or not,
when a determination is made that a determination with respect to said all the segments has been made, conducting timing analysis of the whole of said laid out circuit based on said type of buffer or inverter to be inserted and insertion position, and
when a determination is made as a result of said timing analysis that there is room for improvement in delay of said entire circuit, modifying said laid out circuit based on said determined type of buffer or inverter and insertion position.

11. The delay optimization method as set forth in claim 7, wherein
said conducting optimization comprises the steps of:
  determining existence/non-existence of a path for which optimization is to be conducted among the paths of the circuit laid out by said layout,
  selecting a wire as a target of optimization when determination is made that there exists a path for which said optimization is to be conducted,
  determining an order of execution of optimization for a segment of the wire selected as a target of said optimization,
  calculating all possible combinations of types and insertion positions of buffers or inverters to be inserted in order to satisfy the delay constraints set for said target circuit and calculating the degree of improvement in said delay constraints at a buffer or inverter insertion position for each combination to determine a combination achieving a highest degree of improvement as an optimum combination,
  determining whether with respect to all segments in said laid out circuit, determination of existence/non-existence of a path to which said optimization is to be applied is made or not,
  when a determination is made that a determination with respect to said all the segments has been made, conducting timing analysis of the whole of said laid out circuit based on said determined combination of the type of buffer or inverter and the insertion position, and
  when a determination is made as a result of said timing analysis that there is room for improvement in delay of said entire circuit, modifying said laid out circuit based on said determined combination of the type of buffer or inverter and the insertion position.

12. The delay optimization method as set forth in claim 7, wherein
said conducting re-layout includes a step of reflecting contents of said circuit change information and said inserted buffer information, as well as placing and routing of gates so as to approximate to a circuit structure laid out by said initial layout on remaining conditions as much as possible.

13. A computer readable memory having a computer program for controlling a computer system to execute layout for receiving an input of circuit specification of a target circuit to conduct placing and routing of a gate and optimization for modifying a circuit so as to satisfy delay constraints set for said target circuit, said computer program comprising the steps for controlling the computer system to:
  receiving the input of circuit specification of said target circuit to conduct said initial layout based only on circuit information synthesized based on the circuit specification of the target circuit, as well as extracting wiring information at least including information on a resistance, a capacitance and topology of a wire;
  conducting optimization based on results of said layout with reference to said wiring information extracted by said initial layout, as well as generating circuit change information regarding a changed part of the circuit generated when the circuit is modified by the optimization and inserted buffer information indicative of limitations on buffer insertion for optimization; and
  conducting re-layout with reference to said circuit change information and said inserted buffer information generated by said optimization.

14. The computer readable memory as set forth in claim 13, wherein in said computer program,
said conducting optimization comprises the steps of:
  determining existence/non-existence of a path for which optimization is to be conducted among paths of the circuit laid out by said layout,
  selecting a wire as a target of optimization when a determination is made that there exists a path for which said optimization is to be conducted,
  determining an order of execution of optimization for a segment of the wire selected as a target of said optimization,
  determining a type of buffer or inverter to be inserted and an insertion position so as to satisfy the delay constraints set for said target circuit, and
  generating circuit change information obtained as a result of a change of said laid out circuit based on said determined type of buffer or inverter and insertion position.

15. The computer readable memory as set forth in claim 13, wherein in said stored computer program,
said conducting optimization comprises the steps of:
  determining existence/non-existence of a path for which optimization is to be conducted among paths of the circuit laid out by said layout,
  selecting a wire as a target of optimization when a determination is made that there exists a path for which said optimization is to be conducted,
  determining an order of execution of optimization for a segment of the wire selected as a target of said optimization,
  calculating all possible combinations of types and insertion positions of buffers or inverters to be inserted in order to satisfy the delay constraints set for said target circuit and calculating a degree of improvement in said delay constraints at a buffer or inverter insertion position for each combination to determine a combination achieving a highest degree of improvement as an optimum combination, and
  generating circuit change information obtained as a result of a change of said laid out circuit based on said determined combination of the type of buffer or inverter and the insertion position.

16. The computer readable memory as set forth in claim 13, wherein in said stored computer program,
said conducting optimization comprises the steps of:
  determining existence/non-existence of a path for which optimization is to be conducted among paths of the circuit laid out by said layout,
  selecting a wire as a target of optimization when a determination is made that there exists a path for which said optimization is to be conducted,
  determining a order of execution of optimization for a segment of the wire selected as a target of said optimization,
  determining a type of buffer or inverter to be inserted and an insertion position so as to satisfy the delay constraints set for said target circuit,
  determining whether with respect to all the segments in said laid out circuit, a determination of existence/non-existence of a path to which said optimization is to be applied is made or not,
  when a determination is made that determination with respect to said all segments has been made, conducting timing analysis of the whole of said laid out circuit based on said type of buffer or inverter to be inserted and insertion position, and when a determination is made as a result of said timing analysis that there is room for improvement in delay of said entire circuit, modifying said laid out circuit based on said determined type of buffer or inverter and insertion position.

17. The computer readable memory as set forth in claim 13, wherein in said stored computer program, said conducting optimization comprises the steps of:

determining existence/non-existence of a path for which optimization is to be conducted among paths of the circuit laid out by said layout, selecting a wire as a target of optimization when a determination is made that there exists a path for which said optimization is to be conducted, determining an order of execution of optimization for a segment of the wire selected as a target of said optimization, calculating all possible combinations of types and insertion positions of buffers or inverters to be inserted in order to satisfy the delay constraints set for said target circuit and calculating the degree of improvement in said delay constraints at a buffer or inverter insertion position for each combination to determine a combination achieving a highest degree of improvement as an optimum combination, determining whether with respect to all segments in said laid out circuit, determination of existence/non-existence of a path to which said optimization is to be applied is made or not, when a determination is made that determination with respect to said all the segments has been made, conducting timing analysis of the whole of said laid out circuit based on said determined combination of the type of buffer or inverter and the insertion position, and when a determination is made as a result of said timing analysis that there is room for improvement in delay of said entire circuit, modifying said laid out circuit based on said determined combination of the type of buffer or inverter and the insertion position.

18. The computer readable memory as set forth in claim 13, wherein in said stored computer program, said conducting re-layout includes a step of reflecting contents of said circuit change information and said inserted buffer information, as well as laying out placing and routing of gates so as to approximate to circuit structure laid out by said initial layout on remaining conditions as much as possible.

* * * * *

UNITED STATES PATENT AND TRADEMARK OFFICE
CERTIFICATE OF CORRECTION

PATENT NO. : 6,009,248
DATED : December 28, 1999
INVENTOR(S) : Koichi Sato, et al.

It is certified that error appears in the above-identified patent and that said Letters Patent is hereby corrected as shown below:

Column 13, Line 36: "a" should read --$\alpha$--

Column 18, Line 58, Claim 4: "made that 0. determination" should read

--made that a determination--

Column 18, Line 59: "has a been" should read --has been--

Column 19, Line 49, Claim 7: "t to" should read --to--

Column 21, Line 7, Claim 11: "among the" should read --among--

Column 24, Line 6, Claim 17: "all the" should read --all--

Signed and Sealed this

Twenty-sixth Day of December, 2000

Attest:

Q. TODD DICKINSON

*Attesting Officer*  *Director of Patents and Trademarks*